(12) United States Patent
Knuuttila et al.

(10) Patent No.: US 6,451,725 B1
(45) Date of Patent: Sep. 17, 2002

(54) METHOD FOR PREPARING CATALYST COMPONENTS

(75) Inventors: Hilkka Knuuttila, Porvoo; Harri Hokkanen, Helsinki; Eija Salo, Porvoo, all of (FI)

(73) Assignee: Borealis Technology Oy, Lyngby (DK)

( * ) Notice: Subject to any disclaimer, the term of this patent is extended or adjusted under 35 U.S.C. 154(b) by 0 days.

(21) Appl. No.: 09/489,662

(22) Filed: Jan. 21, 2000

Related U.S. Application Data

(63) Continuation-in-part of application No. 08/930,953, filed as application No. PCT/FI96/00190 on Apr. 10, 1996, now abandoned.

(30) Foreign Application Priority Data

Apr. 12, 1995 (FI) .............................. 951780 U

(51) Int. Cl.$^7$ .............................. C08F 4/52; C08F 4/622; C08F 4/635; C08F 4/642
(52) U.S. Cl. .................. 502/107; 502/117; 526/129; 526/160; 526/907; 526/943
(58) Field of Search ................ 502/107, 117; 526/129, 160, 907, 943

(56) References Cited

U.S. PATENT DOCUMENTS 5,332,706 A    7/1994  Nowlin et al. .............. 502/107
5,677,409 A  * 10/1997  Inoue et al. ................. 526/351
5,763,349 A  *  6/1998  Zandona ..................... 502/104

FOREIGN PATENT DOCUMENTS

| EP | 0206794 | 12/1986 |
| WO | 9421691 | 9/1994 |
| WO | 9512622 | 5/1995 |
| WO | 9515216 | 6/1995 |
| WO | WO9515216 | 6/1995 |

OTHER PUBLICATIONS

Chang, Chemistry, Third edition, McGraw–Hill publishers, Periodic Table on inside cover, 1988.*

* cited by examiner

Primary Examiner—David W. Wu
Assistant Examiner—R. Rabago
(74) Attorney, Agent, or Firm—Birch, Stewart, Kolasch & Birch, LLP

(57) ABSTRACT

Method for preparing a catalyst component for homo or copolymerization of olefins, said catalyst component comprising at least one metallocene compound on porous inorganic carrier, wherein said metallocene compound is mixed as pure compound in the absence of solvents with said carrier at a temperature which is at least 50° C. but below the vaporization temperature of the metallocene compound in reactor conditions for a sufficient time to obtain said catalyst component having said metallocene evenly distributed onto carrier particles.

5 Claims, No Drawings

METHOD FOR PREPARING CATALYST COMPONENTS

This application is a continuation-in-part of application Ser. No. 08/930,953, filed on Jan. 7, 1998, now abandoned, the entire contents of which are hereby incorporated by reference, which is a 371 of PCT/FI96/00190, filed Apr. 10, 1996.

The invention relates to a method for preparing catalyst components. Particularly the invention relates to a method for making catalysts comprising metallocenes of transition metals. Further the invention relates to a process for homo or copolymerization of alphaolefins in the presence of the catalysts made by the method.

Recent developments in the field of olefin polymerization catalysts include metallocene catalysts, which comprise metallocene compounds of transition metals together with alumoxane compounds. These catalysts have been suggested to be used as a homogenous system or deposited onto carrier, for example inorganic oxide carriers. Thus these catalysts typically comprise as a procatalyst component a metallocene compound, for example bis(cyclopentadienyl)titanium dialkyl or bis(cyclopentadienyl)zirconium alkonyl or chlorides thereof, and an activator component, which typically is alumoxane or an ionic activator.

One known problem related to the use of metallocene catalysts is the poor morphology of the resulting polymer particles, which can be seen as a low bulk density and as inhomogenous polymer. Because of the so-called replication phenomena the forming polymer particles assume similar morphology as the catalyts particles used to polymerize monomers, the problems related to poor morphology of polymer can be decreased by improving the morphology of the catalysts used for polymerization.

Supported metallocene catalysts are typically prepared by impregnating methylalumoxane and metallocene compound onto a support or carrier material. Such methods are usually slurry or solution methods, in which the first step is the formation of a solution of the metallocene compound and alumoxane. This solution is added into a porous carrier material, after which the solvent is removed by evaporation. Most often the solvent is used in rather big amounts, even so that the carrier material is added to a solution of metallocene and alumoxane compounds. This kind of method necessitates an efficient evaporating, in which the components rather tend to deposit on the surface of the carrier than to impregnate evenly into the pores of the carrier material. Thus the method leads normally to catalysts having a bad morphology, uneven metallocene distribution on the carrier and thus to a bad quality of polymer particles and to an unnecessarily low catalyst activity.

The use of high amounts of solvents in the preparation of the catalysts is, as such, a disadvantage. There are also methods known in which the amount of the solvent used is limited. Thus for example, in WO94/21691 there is disclosed a method in which the support comprises porous silica, which is contacted with a volume of a mixture comprising a metallocene and an alumoxane, wherein the volume of the mixture is no greater than the total pore volume of the silica. After evaporation of the solvent an active catalyst is achieved, which results in lower fouling of the reactor and improved polymer morphology in the polymerization of alphaolefins.

All methods based on the impregnation of metallocene/alumoxane solutions onto carriers have certain disadvantages. After the evaporation of the solvent the catalysts are in active form and therefore they are very sensitive for poisoning. During a prolonged storage this can lead to a deactivation of the catalyst. This problem can be avoided by preparing the catalysts just before use. However the catalyst preparation itself requires a considerable amount of time involving one or more solvent evaporation steps and so on. Most often the site of the catalyst preparation and the site of polymerization are very far from each other and the transport of the catalyst takes time.

Another disadvantage of the known metallocene catalyst preparation methods is that the solubility of most metallocenes is very poor even in aromatic solvents. A further disadvantage of the known methods in which solutions of metallocene compounds and alumoxane compounds are used is that the stability of these complex solutions is very poor. Yet another disadvantage for some applications is the low molecular weight of the polymerized product. For example, Inoue et al. disclose a method which produces a syndiotactic polypropylene wax having an intrinsic viscosity in a range of 0.01–0.4 dl/g as measured at 135° C. in a tetralin solution, corresponding to a molecular mass of 70–14,000. Thus, there is a need for improved methods for making metallocene catalysts without the disadvantages described above.

The present invention relates to a method for preparing metallocene catalysts for olefin polymerization while avoiding the disadvantages described above. Thus, one object of the invention is a method for making metallocene catalyst components, where the disadvantages related to catalyst poisoning, poor solubility of metallocenes and poor stability of metallocene/alumoxane complexes can be avoided. A further object of the invention is a method in which metallocenes having good morphology and hence a good morphology of the polymer is achieved. Thereby polymers having a very small amount of fines can be produced. Yet another object of the invention is to manufacture a polymer with a narrow molecular weight distribution measured with GPC.

According to the invention it has been surprisingly found that it is possible to add metallocenes onto catalyst carriers without any solvents in a temperature which is, however, below the boiling point of the metallocene compound. Thus the elimination of this step characteristic to all methods in prior art makes possible to avoid the disadvantages of the known methods and to achieve the goals of the invention.

Thus one embodiment of the invention relates to a method for preparing catalyst components for ethylene homo or copolymerization, which catalyst component comprises at least one metallocene compound on porous carrier or support material. The catalyst component is prepared by mixing a metallocene compound, as a pure compound, with a carrier, in the absence of solvents, at a temperature which is at least 50° C., but below the vapourization temperature of the metallocene compound in reactor conditions for a sufficient time so as to obtain the catalyst component with metallocene evenly distributed onto the carrier particles.

By mixing the carrier material with said metallocene in the absence of any solvents a so-called "dry mixing method" having several advantages is achieved. The poor solubility of most metallone compounds into typical solvents and the extra step of removing these solvents are no longer problems. The catalyst according to the method has good morphology properties and no tendency towards fouling in the polymerization. The polymers produced by using the catalysts of the invention have good morphology properties, narrow molecular weight distribution and composition distribution.

The essential feature of the invention is that the metallocene compound is mixed with the carrier particles in dry state. This means that no solvents are used. The metallocene is physically mixed with the carrier material at an elevated temperature for a sufficient time to achieve an even distribution of the metallocene onto carrier particles. The mixing is carried out in the temperature which is at least 50° C. but below the vapourization temperature of the metallocene compound in reaction conditions.

Different metallocene compounds have different melting and boiling points and therefore, different mixing temperatures for each metallocene compound can be used. The upper limit for the highest temperature applicable is the temperature where the metallocene compound vaporizes. Therefore, it is possible to use temperatures, in which the metallocene compound is flowing or even melted. However, in some cases the temperature can be below the melting point of the metallocene compound. The reasons why in such temperatures an even distribution of the metallocene compound can be achieved, is not exactly known, but it is possible that the contact of carrier particles with the metallocene compound at an elevated temperature increases the mobility of the metallocene compound in sufficient degree to achieve an even distribution of the metallocene.

The mixing time for the contact of the metallocene and the carrier material can be selected within broad range. A sufficient mixing time can be found for example by experimentation, but in practice the mixing time can be from one minute to several hours. Mixing times that are too long can be detrimental for the catalyst activity and the stability. Therefore, the preferable mixing time is normally between 5 minutes and 3 hours.

It is preferable that the carrier material and the metallocene compound are first pre-mixed by stirring them at room temperature, or at rather low temperatures, for a period of time which allows the formation of a homogenous physical mixture of the metallocene compound with the carrier material, for example from 10 minutes to 1.5 hours. Thereafter, the temperature is raised to at least 100° C. and the stirring is continued at this temperature for a period of time which can be, for example, from 30 minutes to 1.5 hours.

As metallocene compounds it is possible to use any kind and type of metallocene. Thus, suitable metallocene compounds are those which have a formula (Cp)mRnMR'oXp, where Cp is an unsubstituted or substituted and/or fused homo or heterocyclopentadienyl, R is a group having 1–4 atoms and bridging two Cp rings, M is a transition metal of group 4, 5 or 6 in the IUPAC periodic table of elements (IUPAC 1985), R' is C1–C2 hydrocarbyl or hydrocarboxy group and X is a halogen atom, wherein m is 1–3, n is 0 or 1, p is 0–3 and sum m+o+p corresponds to the oxidation state of the transition metal M. The transition metal is preferably zirconium or hafnium, most preferably zirconium. Examples from suitable metallocene compounds are, among other(s), bis(cyclopentadienyl)zirconium dichloride an bis(indenyl)zirconium dichloride.

The catalyst prepared as above is ready for polymerization without further treatments and washing. Thus the method according to the invention gives great economical advantages over the the prior art technique.

The polymerization activity of the catalyst component described above can be increased by known activator compounds, such as alumoxane compounds. One method is to add the alumoxane compound to the metallocene containing catalyst compound. In that case the alumoxane compound is preferably added by impregnation method, in which a solution of alumoxane compound is impregnated into the catalyst component. The amount of such solution is preferably not greater than the total free pore volume of the catalyst compound already containing the metallocene compound. After impregnation the solvent can be removed, for example, by evaporation. Another method for applying activator compounds is to add it straight into the polymerization reactor along with the metallocene containing catalyst component.

Suitable activators are for example alumoxane compounds having a formula R—(Al(R)—O)$_n$—AlR2 or (—Al(R)—O—)$_m$, where n is 1–40, m is 3–40 and R is a $C_1$–$C_8$ alkyl group. Preferably R is a methyl group.

Alumoxane compounds can be prepared by reacting aluminum trialkyl with water or with hydrated inorganic salts, such as $CuSO_4.5H_2O$ or $Al_2(SO_4)_3.5H_2O$. The reaction product is generally a mixture of linear and cyclic compounds. A preferable alumoxane is methylalumoxane (MAO).

According to a more preferred embodiment of the invention the activator compounds are added to carrier material before adding of the metallocene compound. Thus according to the invention there is achieved a method for preparing a catalyst component for homo or copolymerization of olefins, said catalyst component comprising alumoxane compounds and metallocene compounds on porous inorganic carrier, the method comprising the following steps:

i) said carrier is first impregnated with an alumoxane compound having a formula R—(Al(R)—O)$_n$—AlR2 or (—Al(R)—O—)$_m$, where n is 1–40, m is 3–40 and R is a $C_1$–$C_8$ alkyl group, in order to achieve a first reaction product, ii) said first reaction product is mixed in the absence of solvents with a metallocene compound having a formula (Cp)mRnMR'$_o$X$_p$, where Cp is an unsubstituted or substituted and/or fused homo or heterocyclopentadienyl, R is a group having 1–4 atoms and bridging two Cp rings, M is a transition metal of groups 4, 5 or 6 in the IUPAC periodic table of elements, R' is $C_1$–$C_2$ hydrocarbyl or hydrocarboxy group and X is a halogen atom, wherein m is 1–3, n is 0 or 1, p is 0—3 and sum n+o+p corresponds the oxidation state of the transition metal M, and iii) mixing the product obtained in step (ii) for a sufficient time to obtain said catalyst component having said metallocene evenly distributed onto carrier particles.

The first step of the method above can be carried out, for example, by making a solution of the alumoxane compound in a suitable solvent and by impregnating the carrier material with solution. The solvent can then be removed for example by evaporation or washing. A more preferable method is to mix the carrier material with such amount of the alumoxane solution, which does not exceed the total pore volume of the carrier material used. In that case there is no need to remove excess amounts of alumoxane compound from the carrier and also the amount of the solvent to be evaporated is smaller. Thus the carrier material treated with alumoxane compounds is a stable component, which can be stored for prolonged times without instability problems, because the metallocene compound is not present. Further it is now possible use carrier materials pre-activated with alumoxane and manufactured elsewhere. The metallocene containing catalyst can then be prepared at the polymerization plant just before need with simple and low-cost equipment, because no evaporation or washing steps are not necessary. Also the problems related to poor stability of metallocene/MAO complex solutions in those methods where metallocene and the activator (MAO) are added at the same time as a complex solution, are also avoided according to the invention.

The solvent used in the addition of the alumoxane compound can be any solvent, which dissolves the alumoxane compound used. Typical solvents include various hydrocarbons such as linear and cyclic alkanes and aromatics, e.g. toluene.

The amount of the alumoxane compound is preferably selected so that the ratio of aluminum to the transition metal is from 25 to 10,000, preferably from 50 to 500. The amount of the transition metal in the final catalyst can be between 0.001 and 10 weight percent (on an elemental basis) and the amount of aluminum (on an elemental basis) can be from 1 to 40 weight percent.

The support or carrier material used in the method according to the invention may be any porous, substantially inert support, such as inorganic oxide or salt. In practice, the support used is preferably a fine-grained inorganic oxide such as an inorganic oxide of an element of groups 2, 4, 13 and 14 in the IUPAC periodic table of elements (IUPAC 1985), most preferably silica, alumina or a mixture or derivative of these. Other inorganic oxides which can be used either alone or together with silica, alumina or silica-alumina, are magnesium oxide, titanium dioxide, zirconium oxide, aluminum phosphate etc.

The support used in the method is preferably dry. In general, metal oxide supports also contain surface hydroxyl groups which may react with metallocene or alumoxane. Therefore, the support can be dehydrated or dehydroxylated before use. Such treatment may be either a thermal treatment or a reaction between the surface hydroxyl groups of the support and a reagent contacted with it.

Preferable support materials to be used according to the invention are porous silica or alumina carriers. The pore volume is not critical and can be varied within rather wide limits, but normally in commercial support materials the pore volume is preferably approx. 0.9–3.5 ml/9.

The catalyst prepared according to the invention can be applied to the polymerization or homopolymerization of olefins, especially ethylene and propylene. Comonomers, such as $C_2$–$C_{20}$ olefins, dienes or cyclic olefins or the like can also be used in the polymerization.

The polymerization can be carried out by any polymerization method. Typical methods are slurry polymerization or gas phase polymerization. After polymerization, the resulting polymer is a non-waxy solid with a high molecular mass having a weight averaged molecular weight (Mw) of 50,000–1,000,000, preferably 100,000–800,000. In addition the polymer has a narrow molecular weight distribution (Mw/Mn) of 2–10, preferably 2 to 5, measured by GPC.

In the following the invention is further illustrated by examples.

Support Preparation

EXAMPLE 1

30 g of silica (Davison 955) was dehydrated at 600° C. for 4 hours in nitrogen flow. Then 37.8 ml of 30 percent by weight of methylalumoxane (MAO) in toluene was added to 10.2 ml of toluene. This solution was impregnated onto silica so that only the silica pores were filled with the solution by adding the MAO solution to silica and by mixing for one hour at room temperature. After mixing toluene was evaporated away and the support material containing MAO was obtained as a free flowing powder.

Catalyst Preparation

EXAMPLE 2

8.1 g of the support material prepared in Example 1 was placed in a glass reactor equipped with a stirrer and inert gas system. 91 mg of bis(n-butyl-cyclopentadienyl)zirconium dichloride was weighed and added to the support material and the mixture was stirred as dry powder for one hour. Then the temperature of the reactor was increased to 120° C. and stirring was continued for 1.5 hours during which time the metallocene compound was evenly spread throughout the support material. Then the catalyst obtained was cooled down to room temperature and moved to a glove box. The Al and Zr contents of the catalyst were determined to be 10.8 and 0.164 percent by weight, respectively. The SEM pictures taken from the catalyst showed that there were no crystallites on the silica surface indicating that the metallocene compound was spread throughout the support material.

EXAMPLE 3

A catalyst was prepared as in Example 2, except that 7.6 grams of support material and 84 mg of metallocene compound bis(indenyl)zirconium dichloride was used. SEM pictures indicated same good catalyst morphology as in Example 2.

Polymerization

Polymerization were made in a 3 $dm^3$ stainless steel autoclave reactor equipped with a paddle stirrer and means for continuous supply of ethylene to keep the total pressure at desired value during the run. 1.8 $dm^3$ of dried and deoxygenated n-pentane was added first into the reactor. Then the catalyst weighed in a glove box was added and the reactor was heated up to the desired polymerization temperature. Ethylene and comonomer or ethylene and hydrogen were continuously introduced into the reactor. After 60 minutes the polymerization was stopped by rapidly venting off the ethylene and by cooling down the reactor.

EXAMPLE 4

136 mg of catalyst prepared in Example 2 was weighed for polymerization. The polymerization temperature was 70° C. and hydrogen was fed from a pressurized cylinder (500 ml and 2.1 bar) with ethylene at the beginning of polymerization. Ethylene and hydrogen partial pressure was kept at 10 bar during the polymerization. After one hour the polymerization was stopped and 308 g of polyethylene having melt index $MI_2$ of 0.72 was recovered.

EXAMPLE 5

The polymerization was carried out as in Example 4, but the catalyst amount was 138 mg and hexene (50 ml) was used instead of hydrogen. It was obtained 210 g of ethylene-hexene copolymer having a $MI_2$ of 2.4 and a narrow molecular weight distribution (MWD) of 2.2 measured with GPC. The copolymer contained 1.8 percent by weight of hexene (FTIR). The weight averaged molecular weight (Mw) was 92100.

EXAMPLE 6

The polymerization was carried out as in Example 4, except that 132 mg of the catalyst of Example 3 was used. 257 g of polyethylene having $MI_2$, of 1.6 was obtained.

EXAMPLE 7

The polymerization was carried out as in Example 5 by using 100 mg of catalyst of Example 3, which yielded 24 g of ethylene-hexene copolymer having a melt index ($MI_2$) of 0.21 and a narrow molecular weight distribution (MWD) of 2.7 measured with GPC. The FTIR measurement indicated that there was 1.9 percent by weight of hexene in the polymer chain. The weight average molecular weight (Mw) was 18850.

What is claimed is:

1. A method for preparing a catalyst component for homo or copolymerization of olefins, said method consisting of mixing a) at least one metallocene compound having a formula of $(Cp)_m R_n MR'_o X_p$ as pure compound in the absence of solvents, wherein Cp is an unsubstituted or substituted and/or fused homo or heterocyclopentadienyl, R is a group having 1–4 atoms and bridging two Cp rings, M is a transition metal of groups 4, 5 or 6 in the Peridodic Table of Elements (IUPAC), R' is $C_1$–$C_2$ hydrocarbyl or hydrocarboxy group and X is a halogen atom, wherein m is 1–3, n is 0 or 1, p is 0–3 and sum m+o+p corresponds to the oxidation state of the transition Metal M, and b) a porous inorganic carrier, wherein said carrier is an inorganic oxide of an element of group 2, 4, 13 or 14 in the Periodic Table of Elements (IUPAC), at a temperature which is at least 50° C., but below the vaporization temperature of the metallocene compound, in reactor conditions for a period of one minute to three hours, and then at an increased temperature of at least 100° C., to obtain said metallocene evenly distributed onto said carrier particles.

2. A method for preparing a catalyst component for homo or copolymerization of olefins, said method consisting of i) Impregnating a porous inorganic carrier, wherein said carrier is an inorganic oxide of an element of group 2, 4, 13 or 14 of the Periodic Table of Elements (IUPAC), with an alumoxane activator compound having a formula R—(Al(R)—O)$_n$—AlR2 or R—(Al(R)—O—)$_m$, wherein n is 1–40, m is 3–40 and R is a $C_1$–$C_8$ alkyl group, in order to form a first reaction product, ii) mixing said first reaction product in the absence of solvents with a metallocene compound having a formula of $(Cp)_m R_n MR'_o X_p$, wherein Cp is an unsubstituted or substituted and/or fused homo or heterocyclopentadienyl, R is a group having 1–4 atoms and bridging two Cp rings, M is a transition metal of group 4, 5 or 6 in the Periodic Table of the Elements (IUPAC), R' is $C_1$–$C_2$ hydrocarbyl or hydrocarboxy group and X is a halogen atom, wherein m is 1–3, n is 0 or 1, p is 0–3 and sum m+o+p corresponds to the oxidation state of the transition Metal M, and iii) mixing the product obtained in step (ii) for a sufficient time to obtain a homogenous mixture at a temperature which is at least 50° C., but below the vaporization temperature of the metallocene compound for obtaining the catalyst component.

3. The method according to claim 2, wherein R is a methyl group in said alumoxane activator compound.

4. The method according to claim 2, wherein said alumoxane activator compound is methylalumoxane.

5. The method according to claim 2, wherein the amount of alumoxane is selected so that the ratio of aluminum to the transition metal is from 25:1 to 10,000:1.

* * * * *